United States Patent
Salonaho

(10) Patent No.: US 7,180,878 B1
(45) Date of Patent: Feb. 20, 2007

(54) METHOD FOR DETERMINING A CANDIDATE CELL FOR AN ACTIVE SET

(75) Inventor: Oscar Salonaho, Helsinki (FI)

(73) Assignee: Nokia Corporation, Espoo (FI)

( * ) Notice: Subject to any disclaimer, the term of this patent is extended or adjusted under 35 U.S.C. 154(b) by 1026 days.

(21) Appl. No.: 10/088,314

(22) PCT Filed: Sep. 20, 2000

(86) PCT No.: PCT/FI00/00796

§ 371 (c)(1),
(2), (4) Date: May 3, 2002

(87) PCT Pub. No.: WO01/22763

PCT Pub. Date: Mar. 29, 2001

(30) Foreign Application Priority Data

Sep. 20, 1999 (FI) ................................. 19992005

(51) Int. Cl.
*H04Q 7/00* (2006.01)
*H04Q 7/20* (2006.01)
*H04B 7/216* (2006.01)
*H04L 12/413* (2006.01)

(52) U.S. Cl. ...................... 370/331; 370/335; 370/342; 370/447; 455/437; 455/442

(58) Field of Classification Search ...................... None
See application file for complete search history.

(56) References Cited

U.S. PATENT DOCUMENTS

| 5,577,022 | A | | 11/1996 | Padovani et al. ............. 370/13 |
| 5,678,184 | A | * | 10/1997 | Cutler et al. ................. 455/436 |
| 5,867,565 | A | | 2/1999 | Morikawa |
| 6,119,005 | A | * | 9/2000 | Smolik ........................ 455/436 |
| 6,445,917 | B1 | * | 9/2002 | Bark et al. ................... 455/423 |

(Continued)

FOREIGN PATENT DOCUMENTS

JP 09-36958 9/1997

(Continued)

OTHER PUBLICATIONS

Japanese Office Action Dated Sep. 7, 2004 in Japanese application No. 2001-525994.

(Continued)

*Primary Examiner*—Chi Pham
*Assistant Examiner*—Melanie Jagannathan
(74) *Attorney, Agent, or Firm*—Harrington & Smith, PC

(57) ABSTRACT

A method (200, 300, 400) according to the invention is a method for determining a condidate cell for an active set, where the quality factor of each cell in the active set is determined (202), a quality factor of a test cell is determined (203), and the test cell is accepted (205) as a candidate cell for the active set if an acceptance criterion is fulfilled. The method is characterized in that the acceptance criterion is selected (201) so that for a certain first quality factor of a test cell and for a certain first set of quality factors, consisting of quality factors of the cells in a first active set, the acceptance criterion has the same value as for a certain second quality factor of a test cell and for a certain second set of quality factors, consisting of quality factors of cells in a second active set, when the first quality factor is equal to the second quality factor multiplied with any finite number and the first set of quality factors is the same as a set formed of the quality factors belonging to the second set of quality factors multiplied with the same finite number. The invention relates also to an arrangement, to a mobile station and to a network element where decisions about accepting a cell as a candidate cell for the active set are done.

24 Claims, 5 Drawing Sheets

U.S. PATENT DOCUMENTS

| | | | |
|---|---|---|---|
| 6,456,606 B1 * | 9/2002 | Terasawa | 370/331 |
| 6,507,740 B2 * | 1/2003 | Shi | 455/437 |
| 6,574,326 B1 | 6/2003 | Wong et al. | |
| 6,999,776 B2 * | 2/2006 | Ogino et al. | 342/357.1 |

FOREIGN PATENT DOCUMENTS

| | | |
|---|---|---|
| JP | 10-308964 | 11/1998 |
| JP | 11-113042 | 4/1999 |
| WO | WO 92/10914 | 6/1992 |
| WO | WO 98/56203 | 12/1998 |
| WO | WO 99/04593 | 1/1999 |
| WO | WO 99/20072 | 4/1999 |

OTHER PUBLICATIONS

Office Action dated Jul. 25, 2005 in corresponding Japanese Application No. 2001-557798.

* cited by examiner

METHOD FOR DETERMINING A CANDIDATE CELL FOR AN ACTIVE SET

PRIORITY CLAIM

This is a national stage of PCT application No. PCT/FI00/00796, filed on Sep. 20, 2000. Priority is claimed on that application, and on patent application No. 19992005 filed in Finland on Sep. 20, 1999.

FIELD OF THE INVENTION

The invention relates in general to cellular networks. In particular the invention relates to soft handovers in cellular networks.

BACKGROUND OF THE INVENTION

Transmission diversity refers to a situation where at least two transmitters are transmitting the same data flow to a receiver. For example, a mobile station may receive radio transmissions from two base stations of a cellular network simultaneously. One of the advantages of the transmission diversity is that if the quality or strength of one of the received radio transmissions decreases, the quality of some other received transmissions may still be high enough for receiving data reliably.

A situation where a mobile station communicates with more than one base stations simultaneously is called a soft handover. If necessary, for example to ensure a reliable data transmission, a mobile station may be communicating even most of the time with more than one base stations. In certain situations, when the signal of a certain base station is clearly stronger that the signals of other base stations, it may be enough to communicate with one base station only. There has to be a method for deciding with which base stations a mobile station communicates.

Transmission diversity and soft handovers can be supported, for example, in cellular networks that employ Code Division Multiple Access (CDMA) methods. Each transmitter may use its own spreading code in the downlink transmission, and a mobile station wanting to receive data from many transmitters processes the radio signal it receives with the spreading codes corresponding to the transmitters. The code sequences of different connections must be chosen so that they do not correlate and the code sequence of a specific connection has to autocorrelate. Those signals that have been spread using a code sequence that correlates with the code sequence used in receiving the seemingly white noise radio transmission are separated. The receiver has to know the transmitters code sequence and the code sequences must be synchronized. The bits in the code sequence are called chips.

FIG. 1 presents a schematic drawing of a cellular network which comprises base stations 101a, 101b and 101c. In FIG. 1, these base stations are all connected to a single radio network controller 102 and each base station is in the middle of a cell. FIG. 1 presents one mobile station 10. The base stations transmit downlink data to mobile stations (arrows 120a, 120b and 120c) and receive uplink data from mobile stations (arrows 121a, 121b and 121c).

In general a base station may comprise many transmitters, each of which transmit a separate radio signal. In systems employing CDMA methods, the transmitters may use different spreading codes. Here term cell is used to refer either to a base station or, if a base station comprises many transmitters, to a transmitter. In a situation where a mobile station receives good quality downlink transmissions from many cells, it has to be decided which cell a certain mobile station communicates with.

Usually the cellular network informs the mobile station of the possible cells, for example, selected based on the location of the mobile station. The information about the nearest cells is called neighbor list. In a cellular network which employs CDMA methods, the neighbor list may comprise the downlink spreading codes of the cells. By taking the spreading codes listed in the neighbor list into use, the mobile station may separate the data flows sent to it from each cell from the radio signal it receives. The neighbor list of the mobile station 110 may comprise, for example, the cells corresponding to base stations 101a, 101b and 101c, assuming that a base station corresponds to one cell.

Usually a pilot signal is transmitted in each cell. This pilot signal carries no changing data, so it can be quite straightforwardly used in estimating the quality of the downlink radio transmission of a certain cell. A mobile station may, for example, estimate the quality of the radio transmission of all the cells in the neighbor list. A suitable parameter for quality estimation is, for example in a cellular system employing CDMA methods, the $E_C/I_0$ ratio, where $E_C$ is energy per chip and $I_0$ is the interference. Any other parameter measuring the quality of the signal may also be used.

The cells with which a mobile station communicates form the active set of that mobile station. A radio network controller, for example, directs the downlink data heading to a certain mobile station, to all the cells in the active set. Correspondingly, the mobile station listens to the downlink transmissions of all the cells in the active set. For example, the cells corresponding to base stations 101a and 101b can form the active set of the mobile station 110.

When the mobile station changes its location or the qualities of the downlink radio transmissions of the neighboring cells change for some other reason, it may be necessary to modify the active set. A cell may be added to or removed from the active set, or a cell in the active set may be replaced with another cell. This replacement is usually called branch replacement.

There has to be a criterion for accepting a new cell for the active set. The CDMA2000 RTT description, for example, defines the following criterion for a test cell to be accepted to the active set. The cell may then be added to the active set or, in case of branch replacement, it may replace the worst quality cell in the active set. If the quality factor, for example the $E_C/I_0$ ratio, is marked with $P_i$ for each cell i in the active set, an acceptance limit Q can be calculated by $$Q=\max\{S \cdot 10 \log_{10}(\Sigma P_i)+A, T\}$$

where S, A and T are parameters. As can be seen from the formula for Q, the value of Q is expressed in dB and the quality factor $P_i$ is a plain number. It is checked if a certain cell with quality factor $P_T$ is a proper candidate for the active set by comparing $10\log_{10} P_T$ to Q. If $10\log_{10} P_T$ (i.e. $P_T$ expressed in dB) exceeds Q, then the cell can be added, for example, to the active set. Parameter T ensures that even if the quality factors $P_i$ of the cells currently in the active set are poor, a cell having $P_T$ (expressed in dB) less than T is never accepted as a candidate cell.

There may be other conditions, for example that the active set may not be modified too frequently, that hinder the adding of a new cell to the active set. All neighboring cells not belonging to the active set, for example, may be tested each time the neighbor list changes, and the cells whose quality factor does exceeds the acceptance criterion may be considered to be added to the active set.

The problem with the current acceptance criterion is that it does not ensure proper acceptance decisions when the value of S is different from 0 or 1. Let us consider two examples, when the following values for the parameters are set: S=2, A=−6.0 dB and T=−6 dB. In the first example, the active set contains two cells, each of which has the quality factor value 1, i.e. $P_1$=1 and $P_2$=1. The acceptance limit in this example is Q=0 dB, i.e. a cell having a quality factor of 1 can be, for example, added to the active set. This is an acceptable decision, because the cell has the same quality factor as the cells in the active set.

In the second example the active set contains also two cells, and now the quality factors are $P_1$=3 and $P_2$=3. The acceptance limit in this example is Q=9.5 dB. The quality factors of the cells in the active set are 5 dB, so a cell has to have a quality factor 4.5 dB higher than the cells in the active set to be accepted to the active set. Correspondingly, expressed in absolute values, a cell should have a quality factor $P_C$=9.5 to be accepted to the active set. Intuitively, the acceptance criterion should also in this second example produce the result that a test cell can be accepted to the active set if the quality factor of the cell is larger than 3.

The current acceptance criterion thus leads to situation where intuitively similar situations produce a different acceptance decision. A further problem with the acceptance criterion is that for an active set whose cells have the same quality factors, from here on called an uniform active set, the acceptance limit is not equal to the quality factor.

SUMMARY OF THE INVENTION

The object of the invention is to present a method for determining a candidate cell for the active set. A further object of the invention is to present a method where similar active sets and test cells produce the same acceptance decision. Further, it is advantageous that the method for determining a candidate cell accepts a cell whose quality factor is equal to the quality factor of an uniform active set.

The object of the invention is achieved by selecting the acceptance criterion so that it is indifferent to the absolute values of the quality factors.

A method according to the invention is a method for determining a candidate cell for an active set, where
the quality factor of each cell in the active set is determined,
a quality factor of a test cell is determined, and
the test cell is accepted as a candidate cell for the active set, if an acceptance criterion, which defines a value for a limit for accepting a test cell, is fulfilled, and the method is characterized in that such an acceptance criterion is selected that a first limit value is equal to a second limit value multiplied with a finite number, wherein said first limit value is for a certain first quality factor of a test cell and for a certain first set of quality factors, consisting of quality factors of cells in a first active set, said second limit value is for a certain second quality factor of a test cell and for a certain second set of quality factors, consisting of quality factors of cells in a second active set, and the first quality factor is equal to the second quality factor multiplied with the same finite number and the first set of quality factors is the same as a set formed of the quality factors belonging to the second set of quality factors multiplied with the same finite number.

A method according to the invention is a method for determining a cell to be removed from the active set, where
the quality factor of each cell in the active set is determined,
a rejection criterion is evaluated using the cell having the smallest quality factor as a test cell and a temporary set, which contains the cells of the active set except the cell having the smallest quality factor, and
the test cell is removed from the active set, if a rejection criterion, which defines a value for a limit for rejecting a test cell, is fulfilled, and it is characterized in that such a rejection criterion is selected that a first limit value is equal to a second limit value multiplied with a finite number, wherein said first limit value is for a certain first quality factor of a test cell and for a certain first set of quality factors, consisting of quality factors of cells in a first temporary set, said second limit value is for a certain second quality factor of a test cell and for a certain second set of quality factors, consisting of quality factors of cells in a second temporary set, and the first quality factor is equal to the second quality factor multiplied with the same finite number and the first set of quality factors is the same as a set formed of the quality factors belonging to the second set of quality factors multiplied with the same finite number.

The invention relates also to an arrangement for determining a candidate cell for an active set comprising
means for determining a quality factor for a test cell and
means for determining quality factors for the cells in the active set, which arrangement is characterized in that it further comprises
means for selecting such an acceptance criterion, which defines a value for a limit for accepting a test cell, that a first limit value is equal to a second limit value multiplied with a finite number, wherein said first limit value is for a certain first quality factor of a test cell and for a certain first set of quality factors, consisting of quality factors of cells in a first active set, said second limit value is for a certain second quality factor of a test cell and for a certain second set of quality factors, consisting of quality factors of cells in a second active set, and the first quality factor is equal to the second quality factor multiplied with the same finite number and the first set of quality factors is the same as a set formed of the quality factors belonging to the second set of quality factors multiplied with the same finite number and
means for deciding about the acceptance of the test cell as a candidate cell for the active set using the acceptance criterion.

A mobile station according to the invention comprises
means for determining a quality factor for a test cell and
means for determining quality factors for the cells in the active set, and it is characterized in that it further comprises
means for selecting such an acceptance criterion, which defines a limit for accepting a test cell, that a first limit value is equal to a second limit value multiplied with a finite number, wherein said first limit value is for a certain first quality factor of a test cell and for a certain first set of quality factors, consisting of quality factors of cells in a first active set, the second limit value is for a certain second quality factor of a test cell and for a certain second set of quality factors, consisting of quality factors of cells in a second active set, and the first quality factor is equal to the second quality factor multiplied with the same finite number and the first set of quality factors is the same as a set formed of the quality factors belonging to the second set of quality factors multiplied with the same finite number and means for deciding about the acceptance of the test cell as a candidate cell for the active set using the acceptance criterion.

The invention relates to a network element comprising means for determining a quality factor for a test cell and means for determining quality factors for the cells in the active set, which network element is characterized in that it further comprises means for selecting such an acceptance criterion, which defines a value for a limit for accepting a test cell, that a first limit value is equal to a second limit value multiplied with a finite number, wherein said first limit value is for a certain first quality factor of a test cell and for a certain first set of quality factors, consisting of quality factors of cells in a first active set, said second limit value is for a certain second quality factor of a test cell and for a certain second set of quality factors, consisting of quality factors of cells in a second active set, and the first quality factor is equal to the second quality factor multiplied with the same finite number and the first set of quality factors is the same as a set formed of the quality factors belonging to the second set of quality factors multiplied with the same finite number and means for deciding about the acceptance of the test cell as a candidate cell for the active set using the acceptance criterion.

In a method according to the invention, the quality factors of the cells in the active set are determined. Further, the quality factor of a test cell not in the active set but, for example, in the neighbor list is determined. The choice of the quality factors used in a method according to the invention is not restricted. The term accepting a test cell as a candidate cell for the active cell refers to a situation, where a mobile station or the cellular network notices that a certain cell has good enough quality factor, for example, to be added to the active set. The acceptance of a test cell as a candidate cell may trigger, for example, the transmission of the transmission quality reports from a mobile station to the cellular network. Thereafter the cellular network may decide whether the active set is modified.

In the method according to the invention, the acceptance criterion is selected so that it fulfills the following condition. The acceptance criterion Q' for a test cell having a quality factor $P_T$ and for an active set having n cells, whose quality factors are $P_1, P_2, \ldots, P_n$, is Q'($P_T,P_1,P_2,P_3, \ldots$). The value Q' ($P_T,P_1,P_2,P_3, \ldots$) is equal to the value of acceptance criterion for a test cell having a quality factor $aP_T$ and for an active set having n cells, whose quality factors are $aP_1$, $aP_2, \ldots, aP_n$. Here a is any finite scalar number. The condition for the acceptance criterion can be written as $$\forall a Q'(aP_T, aP_1, aP_2, aP_3, \ldots) = Q'(P_T, P_1, P_2, P_3, \ldots).$$

The quality factor of the test cell and the quality factors of cells in the active set are not restricted, the condition holds for any values of $P_T$ and $P_i$, where $P_i$ is the quality factor of cell i in the active set. An example of a acceptance criterion fulfilling the condition is the following criterion where geometric mean is employed $$Q'(P_T, P_1, P_2, \ldots) : P_T > \sqrt[n]{\prod P_i}$$

because Q'($aP_T,aP_T,aP_2,aP_3, \ldots$) is $$Q'(aP_T, aP_1, aP_2, \ldots) : aP_T > \sqrt[n]{\prod aP_i} = \sqrt[n]{a^n} \sqrt[n]{\prod P_i} = \sqrt[a]{\prod P_i}.$$

If for a certain value of $P_T$, Q'($P_T,P_1,P_2,P_3, \ldots$) is true, then Q'($aP_T,aP_1,aP_2,aP_3, \ldots$) is also true. In other words, if a test cell having quality factor $P_T$ is accepted as a candidate cell for the active set whose cells have quality factors $P_1$ and $P_2$, a test cell having quality factor $aP_T$ is accepted as a candidate cell for the active set whose cells have quality factors $aP_1$ and $aP_2$. It is possible to use only some of the quality factors of the cells in the active set in the acceptance criterion, but typically the quality factors of all cells in the active set are used.

In one embodiment of the invention said acceptance criterion involves a function, whose value depends at least on quality factors of first cells in the active set and on certain parameter values. Said acceptance criterion procudes a same value for said first quality factor of a test cell, said first set of quality factors and first parameter values as for said second quality factor of a test cell, said second set of quality factors and the same first parameter values, said first parameter values being any parameter values.

It may, however, be easier to normalized all the quality factors with a certain number and then use the normalized quality factors. The acceptance decision may, for example, be a function having the normalized quality factors as variables. The normalization factor has to be chosen so that its relative value when compared to the quality factors of the cells in the active set is same for all active sets. The normalization factor may be, for example, the average of the quality factors of the cells in the active set.

It is also possible to use similar methods when deciding about removing a cell from the active set. In this case the cell in the active set having the smallest quality factor is compared to the rest of the active set. Usually the rejection criterion is selected somewhat higher than the acceptance criterion, in order to avoid frequently removing from the active set and adding to the active set a same cell. The acceptance and rejection criterion may employ same mathematical function and parameters, but the parameter values are selected in a proper way.

The diversity gain depends on the relative strengths (for example, quality factors) of the cells in the active set. The main advantage of the method according to the invention is that the acceptance decision depends on the relative sizes of the quality factors and does not pay attention only to the absolute values of the quality factors. The acceptance decisions thus reflect the changes in the diversity gain.

A further advantage of the method according to the invention is that when relative sizes of the quality factors are used, it is easier to predict how a certain acceptance criterion, for example a certain function, behaves. It is enough to study a limited number of examples when, for example, parameter values for an acceptance criterion are selected. Even a further advantage is that the current methods for determining a candidate cell for the active set can be quite easily updated to a method according to the invention. No further measurement results, for example, are needed that are currently available.

The method according to the invention may be carried out, for example, periodically. When a mobile station, for example, detects a new candidate cell for the active set, it may transmit a request for handover or a request for update of the active set to the cellular network. The method according to the invention may also be triggered by a certain event, for example, by the update of the neighbor list. The method according to the invention does not specify if the active set is modified after finding a candidate cell to the active set.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention will now be described more in detail with reference to the preferred embodiments by the way of example and to the accompanying drawings where.

DETAILED DESCRIPTION OF THE PRESENTLY PREFERRED EMBODIMENTS

Figure 1:
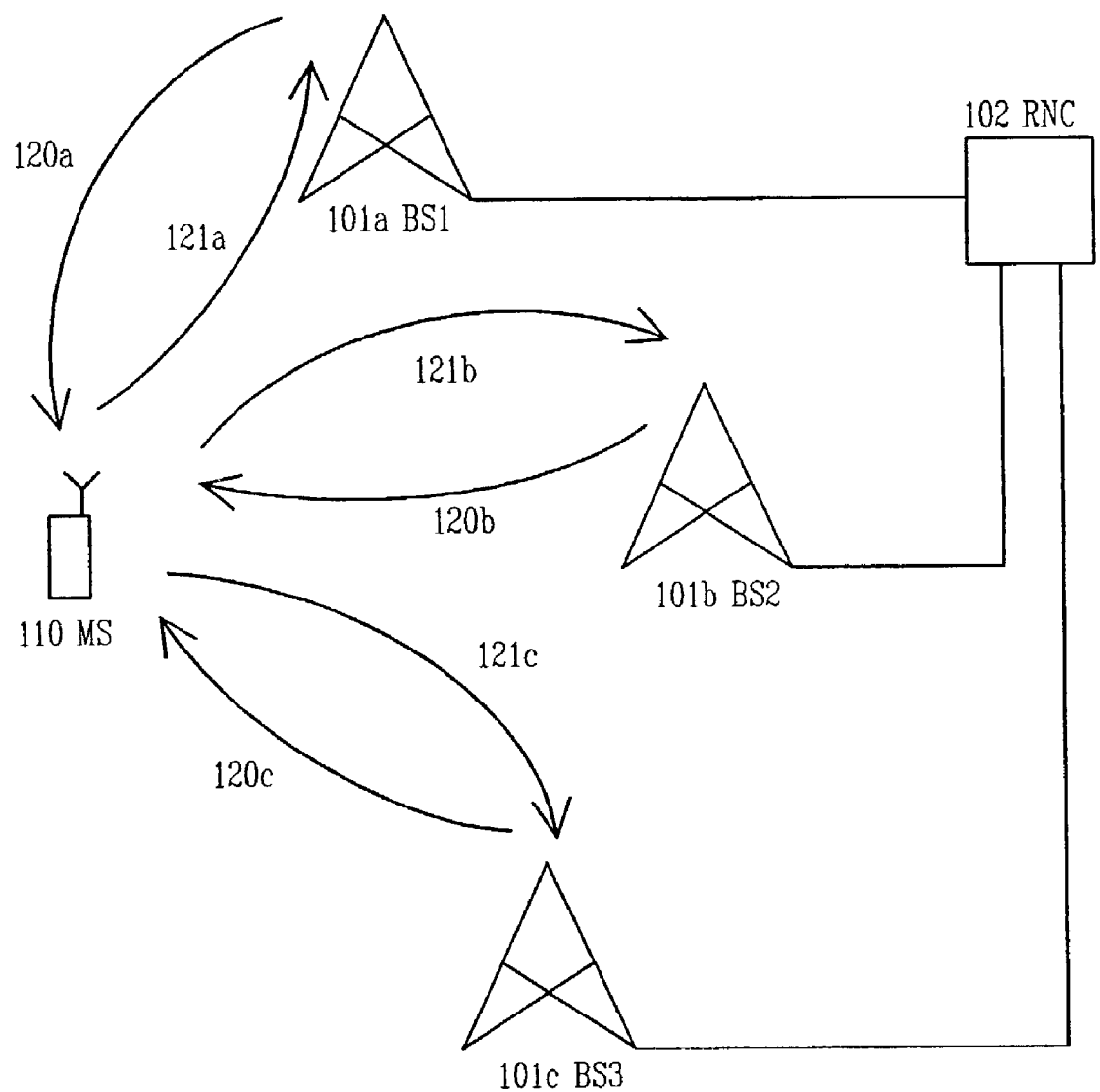
FIG. 1 shows a schematic drawing of the radio access network of a cellular system.

Above in conjunction with the description of the prior art reference was made to FIG. 1. The same reference numerals are used for corresponding parts in the figures.

Figure 2:
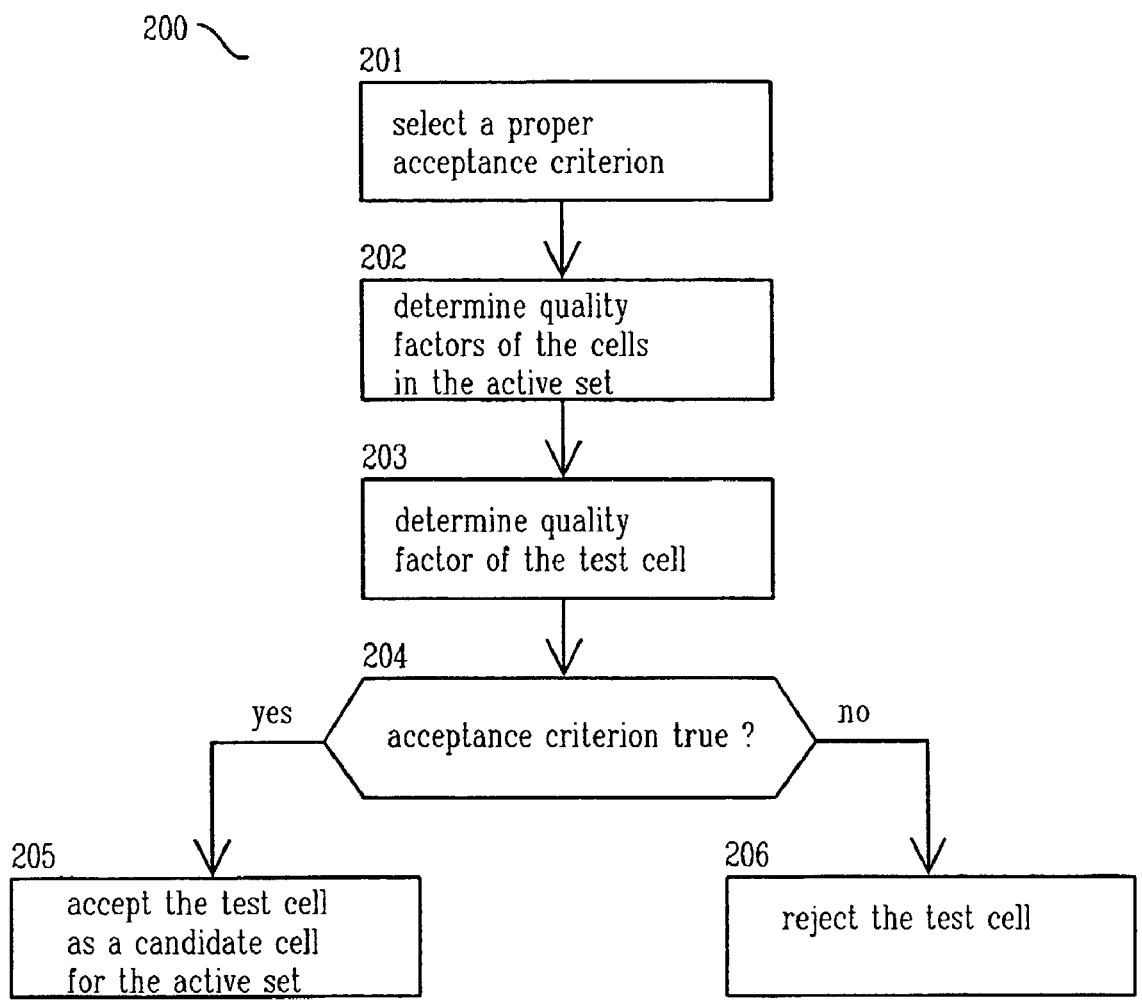
FIG. 2 shows a flowchart of method according to a first preferred embodiment of the invention.

FIG. 2 presents a flowchart of a method 200 according to a first preferred embodiment of the invention. In step 201 a proper acceptance condition is selected. In a method according to the invention, the acceptance criterion Q' has to be of form Q'($aP_T, aP_1, aP_2, aP_3, \ldots$)=Q' ($P_T, P_1, P_2, P_3, \ldots$), where $P_i$ is the quality factor of cell i in the active set, $P_T$ is the quality factor of the test cell, and a is a scalar. The acceptance criterion can be, for example, that the quality factor of the test cell needs to exceed the average of the quality factors of the cells in the active set $$P_T > \frac{1}{n} \Sigma P_i,$$

where n is the number of cells in the active set. Linear combinations of the values $P_i$ and a geometrical mean $$\sqrt[n]{\prod P_i}$$

are examples of functions that can be used in the acceptance criterion Q' according to the first preferred embodiment of the invention.

In step 202 quality factors for the cells belonging to the active set are determined. This may happen, for example, so that a mobile station determines the $E_C/I_0$ ratio for the pilot signals of the cells in the active set. In step 203 the quality factor of a test cell is determined. The test cell may be, for example a cell in the neighbor list that does not belong to the active set. If the acceptance criterion is true (step 204), and the test cell is accepted in step 205 as a candidate cell for the active set. If the quality factor is not large enough, then the test cell is rejected (step 206).

Figure 3:
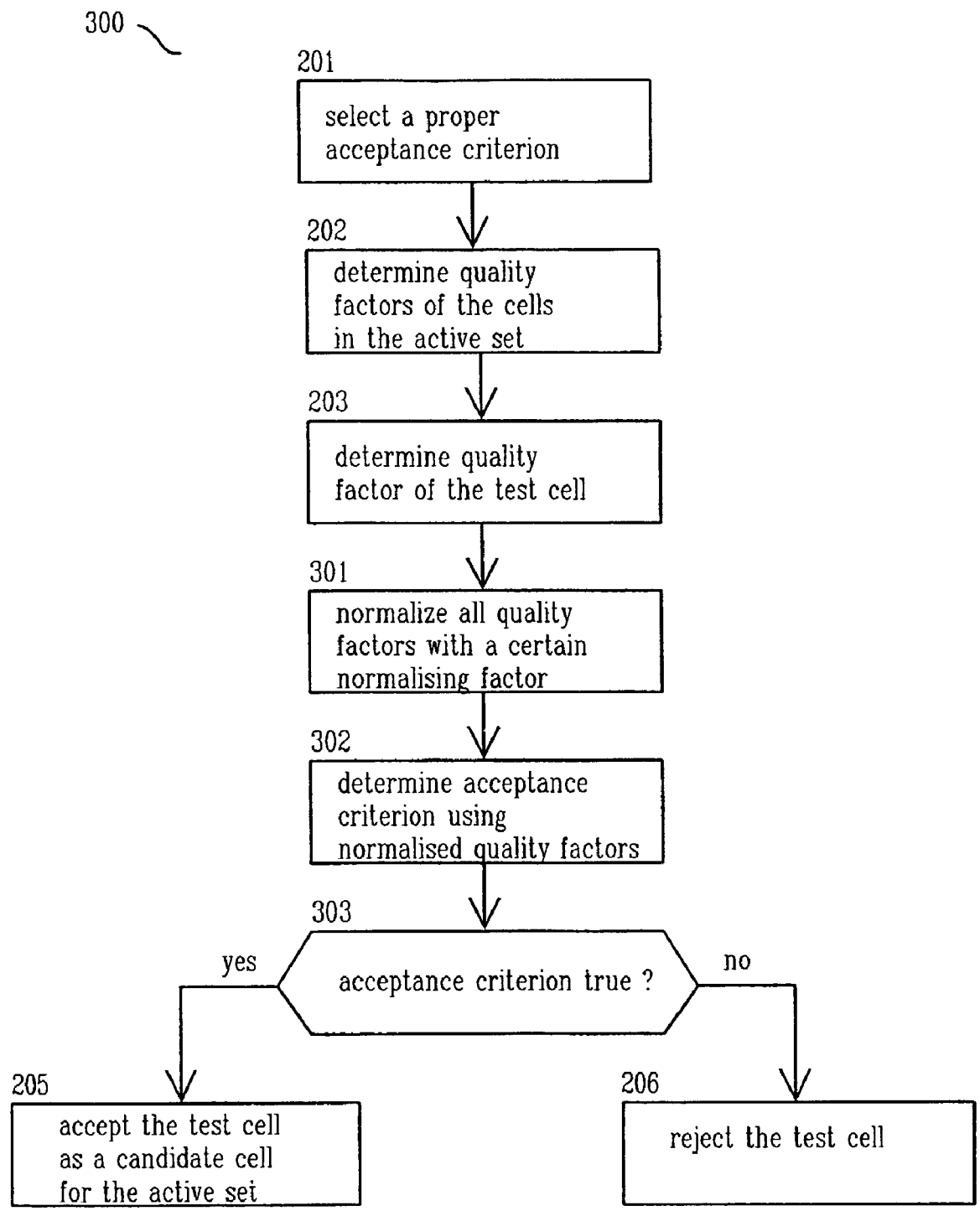
FIG. 3 shows a flowchart of method according to a second preferred embodiment of the invention.

FIG. 3 presents a flowchart of a method 300 according to a second preferred embodiment of the invention. In this method, the quality factors of the cells in the active set and the quality factor of the test cell are normalized by dividing them with a certain normalization factor $P_n$. The normalization factor has to be chosen for each active set so that its ratio to the quality factors of the cells in the active set is the same for all active sets, i.e. for an active set having quality factors $P_1, P_2, P_3, \ldots$ the normalization factor is $P_n$ and for an active set having quality factors $aP_1, aP_2, aP_3, \ldots$ the normalization factor is $aP_n$. For example, the average of the quality factors of the cells in the active set may be used as a normalizing factor $P_n$, or the minimum quality factor or the maximum quality factor of the cells in the active set.

The advantage of using normalized quality factors is that the acceptance criterion Q' may have any functional form and it still obeys Q'($aP_T, aP_1, aP_2, aP_3, \ldots$)=Q' ($P_T, P_1, P_2, P_3, \ldots$). For example, the prior art acceptance limit $$Q = \max\{S \cdot 10 \log_{10}(\Sigma P_i) + A, T\}$$

where S, A and T are parameters can be modified to the following acceptance criterion Q'

$$Q': 10 \log_{10} \frac{P_T}{P_n} > \max\left\{S \cdot 10 \log_{10}\left(\Sigma \frac{P_i}{P_n}\right) + A, T - 10 \log_{10} P_n\right\}.$$

The values for this acceptance criterion are true (when $P_T$ exceeds the condition) and false (when $P_T$ does not exceed the condition).

In FIG. 3, the flowchart of the method 300 starts with the same steps 201, 202 and 203 as method 200. A proper acceptance criterion is selected, the quality factors of the cells in the active set and the quality factor of the test cell is determined. Thereafter, in step 301 these quality factors are normalized with a normalization factor $P_n$. The acceptance criterion in step 302 is determined using the normalized quality factors, for example the functional form presented above may be used for Q'.

In step 303 it is checked if the value for the acceptance criterion is true, and if it is the test cell is accepted as a candidate cell for the active set in step 205. If the value for the acceptance criterion is false, the test cell is rejected in step 206.

Let us study further the method 300 according to the second preferred embodiment of the invention and the presented functional form for Q'. Consider two active sets and the parameter values A=−6.0 dB, S=2 and T=−6.0 dB. In the first active set there are two cells whose quality factors are 1 and 1, and in the second active set the quality factors for the cells in the active set are 3 and 3. Let us choose the normalizing factor $P_n$ as the average quality factor of the cells in the active set. The acceptance criterion becomes $$Q': 10 \log_{10} \frac{P_T}{P_n} > \max\{0 \text{ dB}, -10.8 \text{ dB}\} = 0 \text{ dB}$$

indicating that in both examples the quality factor of the test cell has to be larger than the normalization factor for the test cell to be accepted as a candidate cell for the active set.

Let us consider one further example using the same parameter values for A, S and T. The active set contains in this case two cells, whose quality factors are $P_1=1$ and $P_2=3$. Let us study the effect of the normalization factor by trying three normalization factors: $P_{n1}=P_{max}=3$, $P_{n2}=P_{ave}=2$ and $P_{n3}=P_{min}=1$. For the first normalization factor the acceptance criterion becomes $$Q_1': 10 \log_{10} \frac{P_T}{P_{n1}} > \max\{-3.5 \text{ dB}, -10.8 \text{ dB}\} =$$

$$-3.5 \text{ dB} \Rightarrow P_T > 0.45 P_{n1} = 1.3.$$

For the second and third normalization factors the acceptance criteria are $$Q_2': 10 \log_{10} \frac{P_T}{P_{n2}} > \max\{0 \text{ dB}, -9 \text{ dB}\} = 0 \text{ dB} \Rightarrow P_T > P_{n2} = 2 \text{ and}$$

$$Q_3': 10 \log_{10} \frac{P_T}{P_{n3}} > \max\{6 \text{ dB}, -6 \text{ dB}\} = 6 \text{ dB} \Rightarrow P_T > 4.0 P_{n3} = 4.$$

The choice of the normalization factor thus clearly affects the acceptance criterion. When using, for example, the minimum quality factor of the cells in the active set as a normalization factor, the criterion becomes more demanding than when, for example, the maximum quality factor of the cells in the active set is chosen. By choosing the normalization factor properly it is thus possible to adjust the behavior of a method according to the second preferred embodiment of the invention. When using the maximum quality factor in normalization, more cells are accepted as candidate cells for the active set.

Figure 4:
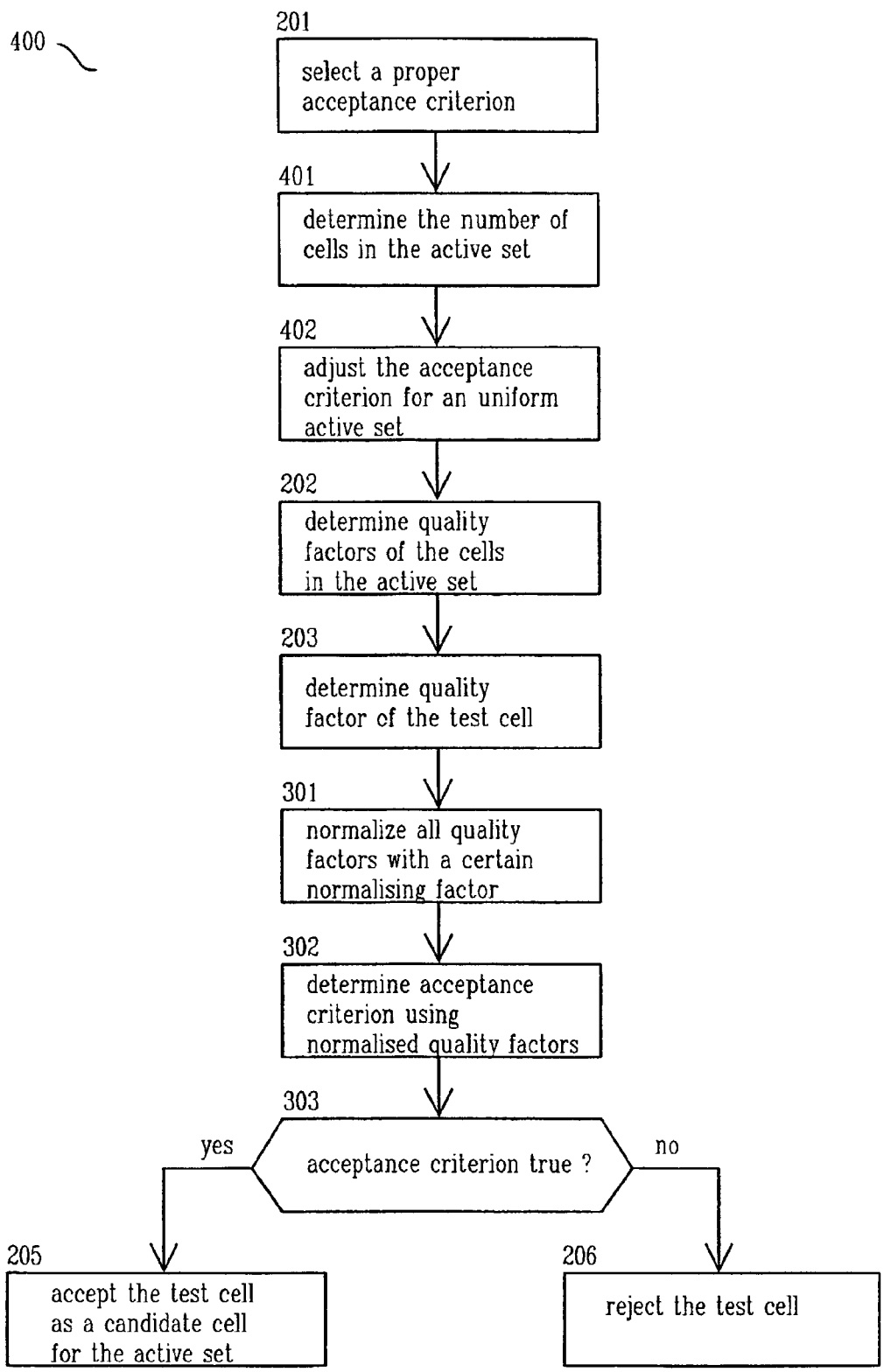
FIG. 4 shows a flowchart of method according to a third preferred embodiment of the invention.

FIG. 4 presents a flowchart of a method 400 according to a third preferred embodiment of the invention. In this method the quality factors of the cells in the active set and the quality factor of the test cell are normalized similarly as in method 300. Further, in this method the acceptance criterion is adjusted so that in a case, where the active set contains cells which all have the same quality factor, a test cell is accepted as a candidate cell for the active set when its quality factor is larger than the quality factor of the cells in the active set.

As an example, let us again consider the acceptance criterion Q'

$$Q': 10 \log_{10} \frac{P_T}{P_n} > \max\left\{S \cdot 10 \log_{10}\left(\Sigma \frac{P_i}{P_n}\right) + A, T - 10 \log_{10} P_n\right\}.$$

When all cells in the active set have the same quality factor p, the sum of the quality factors is equal to np. A test cell having the same quality factor p should fulfill the following condition $$10 \log_{10} \frac{p}{P_n} = \max\left\{S \cdot 10 \log_{10} \frac{np}{P_n} + A, T - 10 \log_{10} P_n\right\}.$$

Further, let us first study parameters A and S, and choose T thereafter. This results in equation $$10 \log_{10} \frac{p}{P_n} = S \cdot 10 \log_{10} \frac{np}{P_n} + A,$$

and the relation between A and S can be written as $$A = (1-S) \cdot 10 \log_{10} \frac{p}{P} - S \cdot 10 \log_{10} n.$$

If the normalization factor $P_n$ is the average/maximum/minimum quality factor of the cells in the active set, for an active set containing cells whose quality factors are equal to p the normalization factor is $P_n=p$. The relation between A and S thus becomes $$A = (1-S) \cdot 10 \log_{10} \frac{p}{p} - S \cdot 10 \log_{10} n = -S \cdot 10 \log_{10} n.$$

If the normalization factor is not equal to p for an active set whose cells all have quality factor p, the first term also contributes to the relation. For example, if the number of cells in the active set is two (i.e. n=2), the relation between the parameter values is A=−3S. When n=3, the relation is A=−4.8S. The value for parameter T can be chosen so that T<0.

In method 400 in FIG. 4, after the acceptance criterion has been selected in step 201 the number of cells in the active set is determined in step 401. In step 402 the acceptance criterion is adjusted for an uniform active set, where all cells have the same quality factor p similarly as explained above. The acceptance criterion may depend at least on the number of cells in the active set and on the choice of the normalization factor. After the acceptance criterion has been adjusted, the method 400 continues similarly as method 300 from step 202 onwards.

Figure 5:
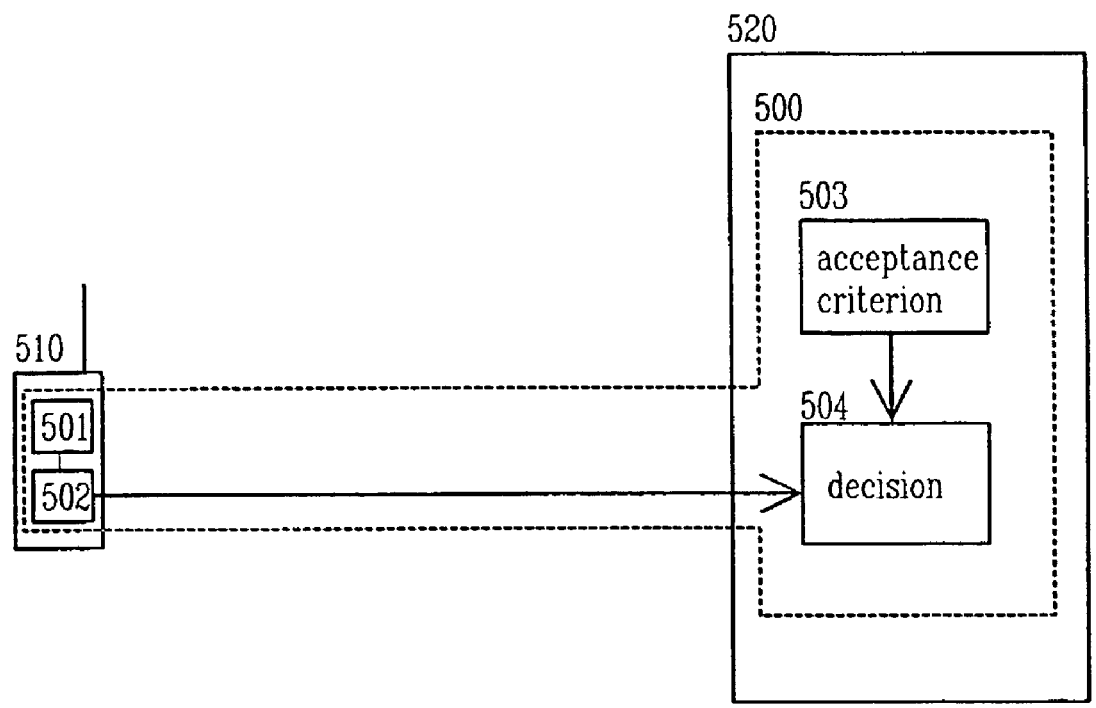
FIG. 5 shows a schematic drawing of an arrangement, a mobile station and a network element that employ a method according to the invention.

FIG. 5 present an arrangement 500, a mobile station 510 and a network element 520 where a method according to the invention is implemented. The arrangement for determining a candidate cell for the active set comprises a test cell block 501, where the quality factor for a test cell is determined. It also comprises an active set block 502, where the quality factors for the cells belonging to the active cell are determined. It is advantageous to measure the quality factors of the cells belonging to the active set each time the quality factors are needed, but it is also possible to store the values in memory and update them, for example, periodically.

The arrangement 500 further comprises an acceptance criterion block 503, where the acceptance criterion is selected and possible adjusted. In the decision block 504 the quality factors of the test cell and of the cell belonging to the active set are used to evaluate the acceptance criterion. The blocks may be implemented, for example, using microprocessors and proper program code.

FIG. 5 shows how the block of the arrangement may be located to more than one device. In FIG. 5, the mobile station 510 comprises block 501 and 502, i.e. it determines the quality factors for the cells in the active set and for the test cell. It may, for example, measure the $E_C/I_0$ ratio of the pilot signals of neighboring cells. The measurement results may be transferred to a network element 520 of the cellular network. This network element may be in charge of determining if the test cell is accepted as a candidate cell for the active set.

It is also possible that a mobile station comprises the whole arrangement 500, and when it detects a candidate cell for the active set, it informs the cellular network about the candidate cell and possibly about the quality factor of the candidate cell and about the quality factors of the cells in the active set. When selecting the cells for the active set in the uplink direction, a network element 520 may comprise the whole arrangement 500.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method for determining a candidate cell for one of a first active set and a second active set, the method comprising:
   determining a quality factor for each cell in an active set for which the candidate cell is to be determined;
   determining the quality factor of a test cell;
   accepting the test cell as a candidate cell for the active set for which the candidate cell is to be determined, if an acceptance criterion, which defines a value as a limit for accepting the test cell, is fulfilled;
   selecting the acceptance criterion so that within the acceptance criterion a first limit value is equal to a second limit value multiplied by a finite number;
   wherein said first limit value is for a certain first quality factor of the test cell and for a certain first set of quality factors, consisting of quality factors of cells in the first active set, said second limit value is for a certain second quality factor of the test cell and for a certain second set of quality factors, consisting of quality factors of cells in the second active set, and the first quality factor is equal to the second quality factor multiplied with the finite number and the first set of quality factors is identical to a set formed of the quality factors belonging to the second set of quality factors multiplied by the finite number.

2. The method of claim 1, wherein said acceptance criterion involves a function, whose value depends at least on quality factors of first cells in the active set for which the candidate cell is to be determined and on certain parameter values, and wherein said acceptance criterion produces the first limit value for said first quality factor of the test cell, said first set of quality factors and first parameter values, which first limit value is equal to a second limit value multiplied by the finite number, said second limit value being for said second quality factor of the test cell, said second set of quality factors and said first parameter values, said first parameter values being any parameter values.

3. The method of claim 1, wherein the quality factor of the test cell and the quality factors of the cells in the active set for which the candidate cell is to be determined are normalized with a number having a predefined relative value compared to values of the quality factors of the cells in the active set for which the candidate cell is to be determined, the value for the limit is determined using normalized quality factors of the cells in the active set for which the candidate cell is to be determined and the normalized quality factor of the test cell and the test cell is accepted as a candidate cell, if the acceptance criterion is fulfilled.

4. The method of claim 3, wherein the quality factors are normalized using a largest quality factor of the quality factors of the cells in the active set for which the candidate cell is to be determined.

5. The method of claim 3, wherein the quality factors are normalized using a smallest quality factor of the quality factors of the cells in the active set for which the candidate cell is to be determined.

6. The method of claim 3, wherein the quality factors are normalized using an average quality factor of the quality factors of the cells in the active set for which the candidate cell is to be determined.

7. The method of claim 1, wherein the acceptance criterion is such that for the active set for which the candidate cell is to be determined and where all the cells have a certain quality factor, the limit is that certain quality factor.

8. The method of claim 1, wherein the method is executed periodically.

9. The method of claim 1, wherein the method is triggered by a certain event.

10. The method of claim 1, wherein the candidate cell is added to the active set for which the candidate cell is to be determined.

11. The method of claim 1, wherein the cell having a worst quality factor in the active set for which the candidate cell is to be determined is replaced with the candidate cell.

12. A method for determining a cell to be removed from one of a first active set and a second active set, comprising:
   determining a quality factor for each cell in an active set from which the cell is to be removed;
   evaluating a rejection criterion using the cell having a smallest quality factor as a test cell and a temporary set, which contains cells of the active set from which the cell is to be removed except the cell having the smallest quality factor;
   removing the test cell from the active set from which the cell is to be removed, if a rejection criterion, which defines a value as a limit for rejecting the test cell, is fulfilled; and
   selecting the rejection criterion so that within the rejection criterion a first limit value is equal to a second limit value multiplied by a finite number;
   wherein said first limit value is for a certain first quality factor of a test cell and for a certain first set of quality factors, consisting of quality factors of cells in a first temporary set, which contains the cells of the first active set except the cell of the first active set having the smallest quantity factor, and the second limit value is for a certain second quality factor of a test cell and for a certain second set of quality factors, consisting of quality factors of cells in a second temporary set, which contains the cells of the second active set except the cell of the second active set having the smallest quantity factor, and the first quality factor is equal to the second quality factor multiplied by the finite number and the first set of quality factors is identical to a set formed of the quality factors belonging to the second set of quality factors multiplied by the finite number.

13. The method of claim 12, wherein said rejection criterion involves a function, whose value depends at least on quality factors of first cells in the temporary set and on certain parameter values, and wherein said rejection criterion produces the first limit value for said first quality factor of the test cell, said first set of quality factors and first parameter values, which first limit value is equal to the second limit value multiplied by the same finite number, the second limit value being for said second quality factor of the test cell, said second set of quality factors and said first parameter values, said first parameter values being any parameter values.

14. An arrangement for determining a candidate cell for one of a first active set and a second active set, comprising:
means for determining a quality factor for a test cell;
means for determining quality factors for cells in the active set for which the candidate cell is to be determined;
means for selecting an acceptance criterion, which defines a value as a limit for accepting the test cell and in which a first limit value is equal to a second limit value multiplied by a finite number, said first limit value being for a certain first quality factor of the test cell and for a certain first set of quality factors, consisting of quality factors of cells in the first active set, the second limit value being for a certain second quality factor of the test cell and for a certain second set of quality factors, consisting of quality factors of cells in the second active set, and the first quality factor being equal to the second quality factor multiplied by the same finite number and the first set of quality factors being identical to a set formed of the quality factors belonging to the second set of quality factors multiplied by the finite number; and
means for deciding about the acceptance of the test cell as a candidate cell for the active set for which the candidate cell is to be determined using the acceptance criterion.

15. The arrangement of claim 14, wherein said acceptance criterion involves a function, whose value depends at least on quality factors of first cells in the active set for which the candidate cell is to be determined and on certain parameter values, and wherein said acceptance criterion produces a first limit value for said first quality factor of the test cell, said first set of quality factors and first parameter values, which first limit value is equal to the second limit value multiplied by the finite number, the second limit value being for said second quality factor of the test cell, said second set of quality factors and said first parameter values, said first parameter values being any parameter values.

16. A mobile station, comprising:
means for determining a quality factor for a test cell;
means (502) for determining quality factors for cells in one of a first active set and a second active set;
means for selecting an acceptance criterion, which defines a value as a limit for accepting the test cell and in which a first limit value is equal to a second limit value multiplied by a finite number, said first limit value being for a certain first quality factor of the test cell and for a certain first set of quality factors, consisting of quality factors of cells in the first active set, the second limit value being for a certain second quality factor of the test cell and for a certain second set of quality factors, consisting of quality factors of cells in the second active set, and the first quality factor being equal to the second quality factor multiplied by the same finite number and the first set of quality factors being identical to a set formed of a quality factors belonging to the second set of quality factors multiplied by the finite number; and
means for deciding about the acceptance of the test cell as a candidate cell for the active set for which the candidate cell is to be determined using the acceptance criterion.

17. The mobile station of claim 16, wherein said acceptance criterion involves a function, whose value depends at least on quality factors of first cells in the active set for which the candidate cell is to be determined and on certain parameter values, and wherein said acceptance criterion produces the first limit value for said first quality factor of the test cell, said first set of quality factors and first parameter values, which first limit value is equal to the second limit value multiplied by the finite number, the second limit value being for said second quality factor of the test cell, said second set of quality factors and said first parameter values, said first parameter values being any parameter values.

18. The mobile station of claim 16, said mobile station is a mobile station of an Universal Mobile Communication System.

19. A network element, comprising:
means for determining a quality factor for a test cell;
means (502) for determining quality factors for cells in one of a first active set and a second active set;
means for selecting an acceptance criterion, which defines a value as a limit for accepting the test cell and in which a first limit value is equal to a second limit value multiplied by a finite number, said first limit value being for a certain first quality factor of the test cell and for a certain first set of quality factors, consisting of quality factors of cells in the first active set, said second limit value being for a certain second quality factor of the test cell and for certain second set of quality factors, consisting of quality factors of cells in the second active set, and the first quality factor is equal to the second quality factor multiplied by the finite number and the first set of quality factors being identical to a set formed of the quality factors belonging to the second set of quality factors multiplied by the finite number; and
means for deciding about the acceptance of the test cell as a candidate cell for the active set for which the candidate cell is to be determined using the acceptance criterion.

20. The network element of claim 19, wherein the network element is a network element of a radio access network of an Universal Mobile Communication System.

21. The network element of claim 20, wherein the network element is a Radio Network Controller.

22. The network element of claim 19, wherein said acceptance criterion involves a function, whose value depends at least on quality factors of first cells in the active set for which the candidate cell is to be determined and on certain parameter values, and wherein said acceptance criterion produces the first limit value for said first quality factor of the test cell, said first set of quality factors and first parameter values, which first limit value is equal to the second limit value multiplied by the finite number, the second limit value being for said second quality factor of the test cell, said second set of quality factors and said first parameter values, said first parameter values being any parameter values.

23. An apparatus, comprising:
   a test cell block configured to determine a quality factor for a test cell;
   an active cell block configured to determine quality factors for cells in one of a first active set and a second active set;
   an acceptance criterion block configured to select an acceptance criterion, which defines a value as a limit for accepting the test cell and in which a first limit value is equal to a second limit value multiplied by a finite number, said first limit value being for a certain first quality factor of the test cell and for a certain first set of quality factors, consisting of quality factors of cells in the first active set, said second limit value being for a certain second quality factor of the test cell and for a certain second set of quality factors, consisting of quality factors of cells in the second active set, and the first quality factor being equal to the second quality factor multiplied by the finite number and the first set of quality factors being identical to a set formed of the quality factors belonging to the second set of quality factors multiplied by the finite number; and
   a decision block configured to decide whether to accept the test cell as a candidate cell for the active set for which the candidate cell is to be determined using the acceptance criterion.

24. A method, comprising:
   determining a quality factor for each cell in one of a first active set and a second active set;
   determining a quality factor of a test cell; and
   accepting the test cell as a candidate cell for an active set for which the candidate cell is to be determined, if an acceptance criterion, which defines a value as a limit for accepting the test cell, is fulfilled;
   wherein the acceptance criterion is selected so that within the acceptance criterion a first limit value is equal to a second limit value multiplied by a finite number, said first limit value being for a certain first quality factor of the test cell and for a certain first set of quality factors, consisting of quality factors of cells in the first active set, said second limit value being for a certain second quality factor of a test cell and for a certain second set of quality factors, consisting of quality factors of cells in the second active set, and said first quality factor being equal to the second quality factor multiplied by the finite number and the first set of quality factors being identical to a set formed of the quality factors belonging to the second set of quality factors multiplied by the finite number.

* * * * *